(12) United States Patent
Muguruma et al.

(10) Patent No.: US 11,024,336 B1
(45) Date of Patent: Jun. 1, 2021

(54) MAGNETIC DISK DEVICE AND MEMORY MANAGEMENT METHOD OF MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Naota Muguruma, Yokohama Kanagawa (JP); Kenji Yoshida, Kamakura Kanagawa (JP); Kazuya Takada, Chigasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/017,880

(22) Filed: Sep. 11, 2020

(30) Foreign Application Priority Data

Mar. 3, 2020 (JP) .............................. JP2020-035744

(51) Int. Cl.
*G11B 27/36* (2006.01)
*G11B 5/00* (2006.01)
*G11B 19/04* (2006.01)
*G11B 5/02* (2006.01)

(52) U.S. Cl.
CPC .............. *G11B 19/044* (2013.01); *G11B 5/02* (2013.01)

(58) Field of Classification Search
CPC .. G11B 27/36; G11B 5/09; G11B 5/00; G11B 20/10; G11B 20/12; G11B 5/5534; G11B 5/5535; G11B 55/47
USPC .............................. 360/31, 39, 48, 55, 78.07
See application file for complete search history.

(56) References Cited

U.S. PATENT DOCUMENTS

| | | | |
|---|---|---|---|
| 7,447,843 B2 | 11/2008 | Ishikawa et al. | |
| 8,751,766 B2 | 6/2014 | Inoue et al. | |
| 8,947,990 B2* | 2/2015 | Aoki | G11B 27/36 369/53.41 |
| 9,535,844 B1 | 1/2017 | Cooney et al. | |

* cited by examiner

*Primary Examiner* — Nabil Z Hindi
(74) *Attorney, Agent, or Firm* — White & Case LLP

(57) ABSTRACT

According to one embodiment, a magnetic disk device includes a magnetic disk, an actuator, a nonvolatile memory, and a controller. When a first determination condition of whether a total value of an amount of data for which execution completion has not been notified in one processing thread that executes a write command, the data having not been written to the magnetic disk, and an amount of the data for which execution completion has been notified in another processing thread that executes the write command, the data having not been written to the magnetic disk, is less than or equal to a capacity of the nonvolatile memory holds, the controller notifies the host of execution completion of the write command in the one processing thread.

12 Claims, 12 Drawing Sheets

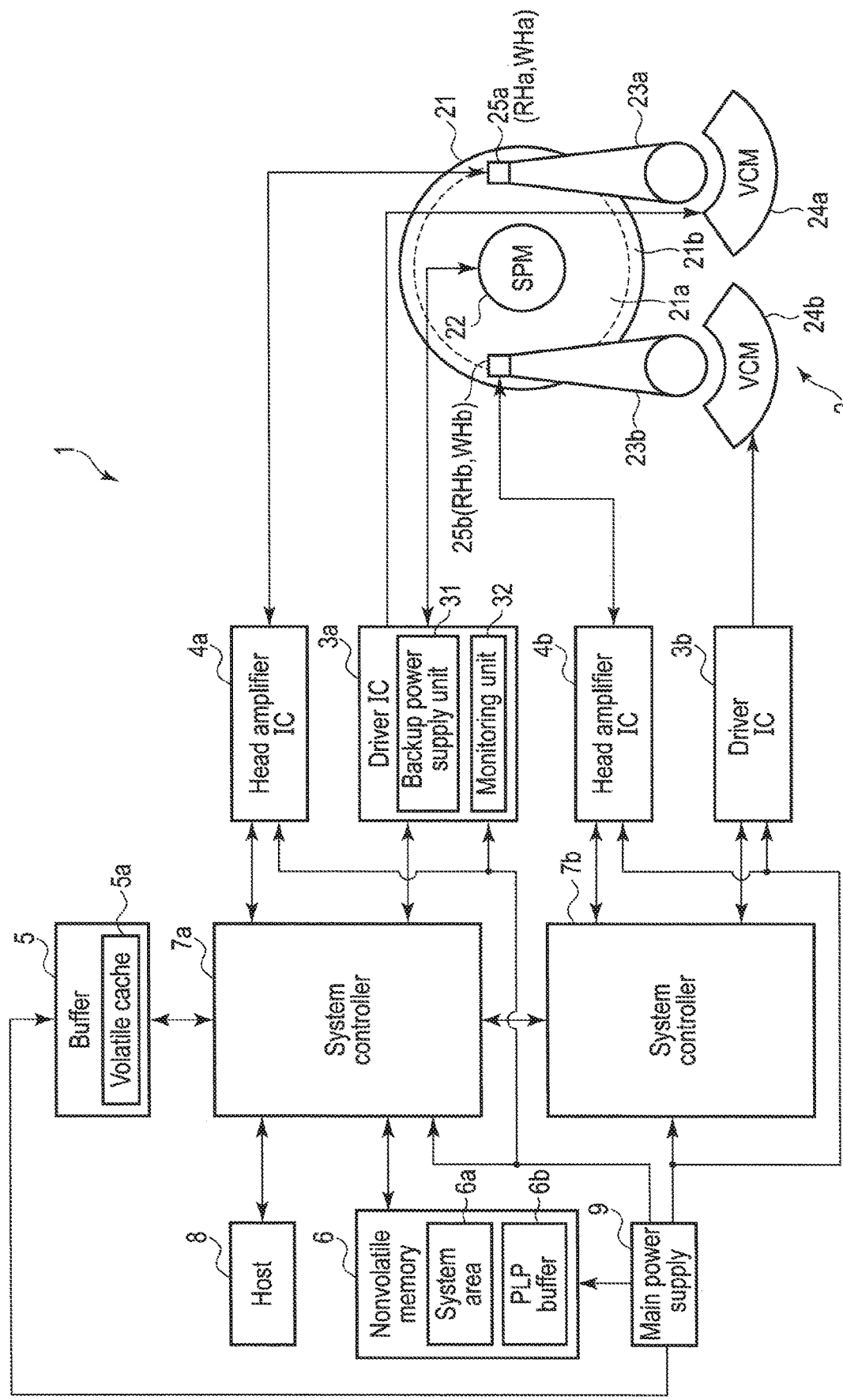
F I G. 1

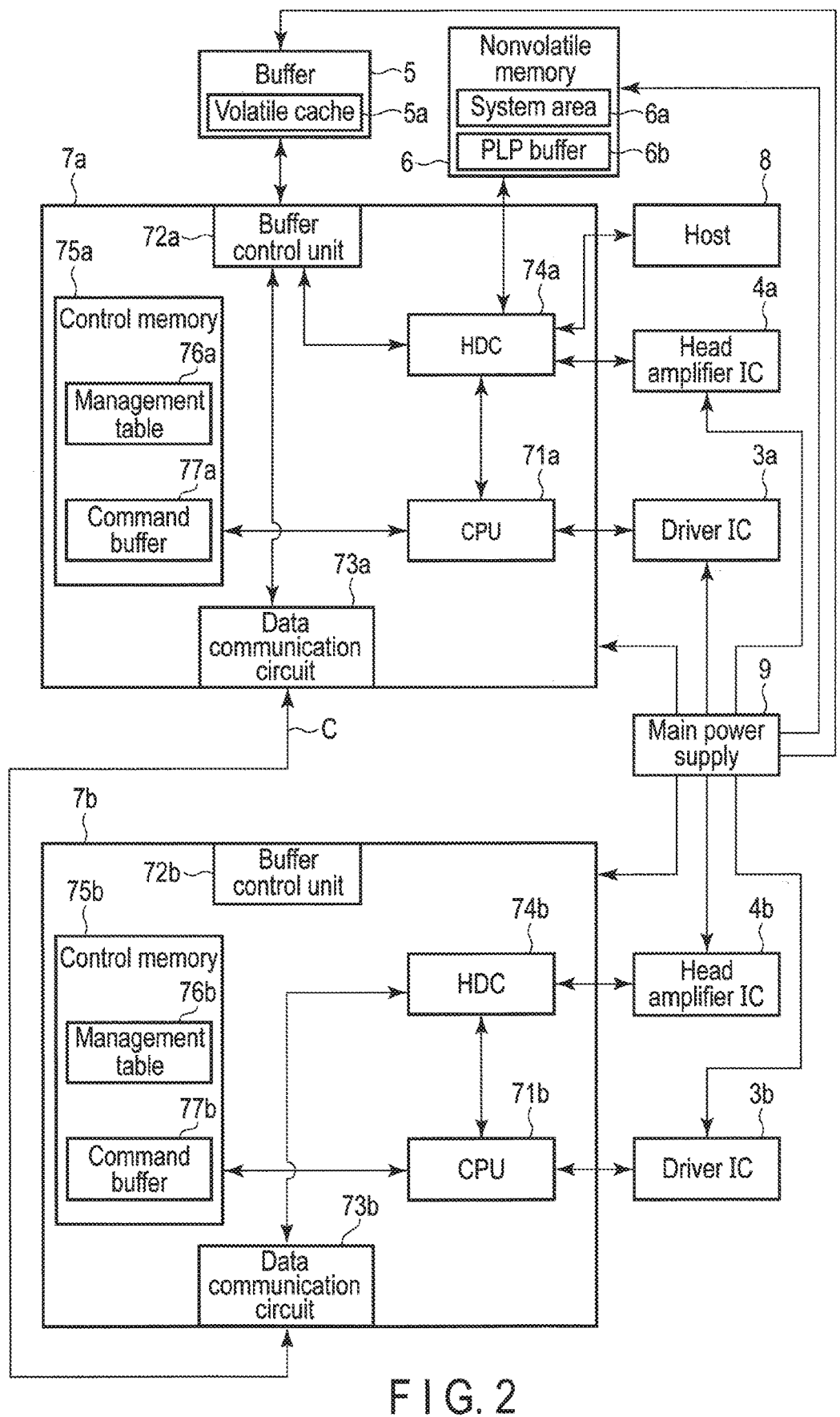
F I G. 2

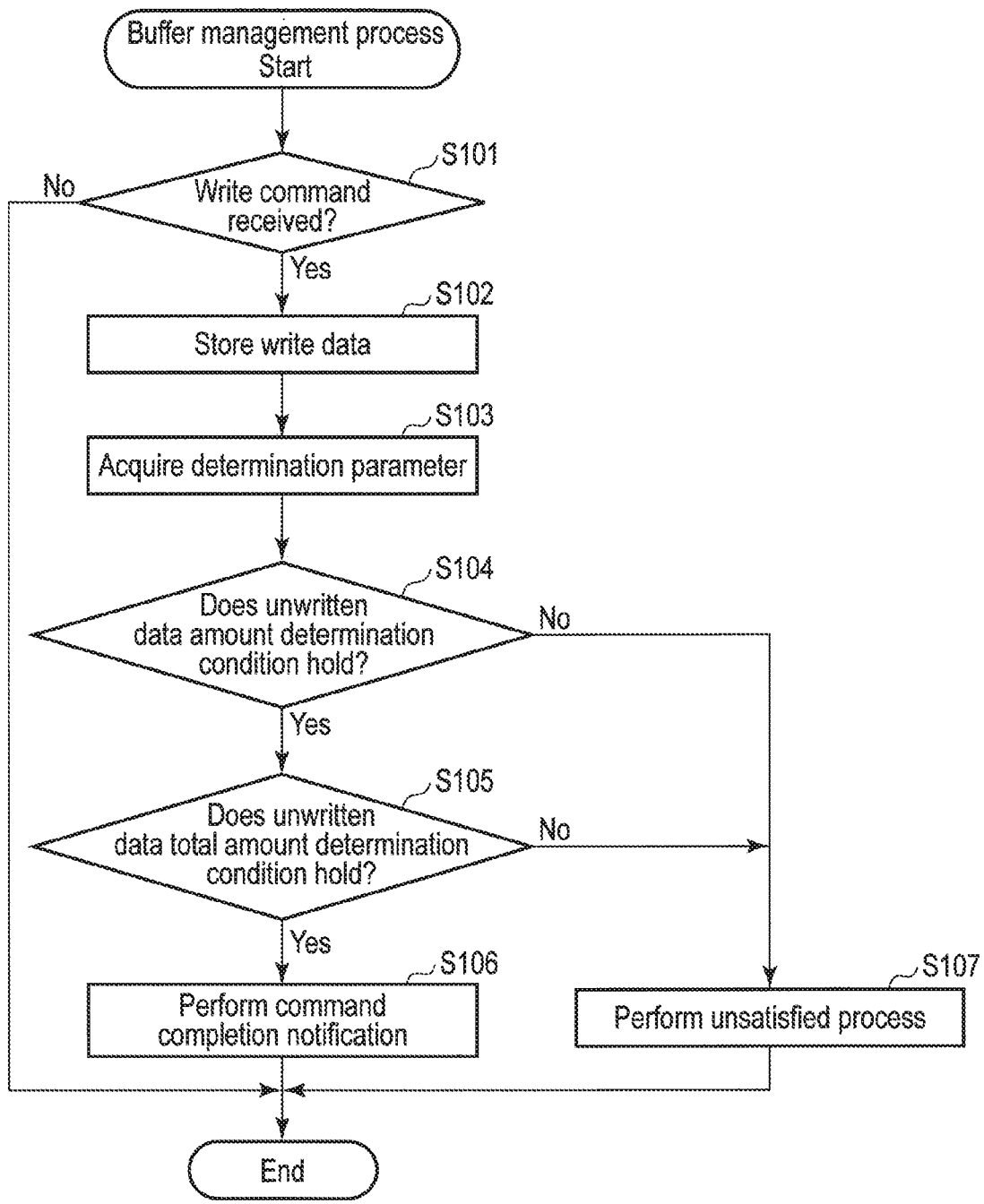
F I G. 3

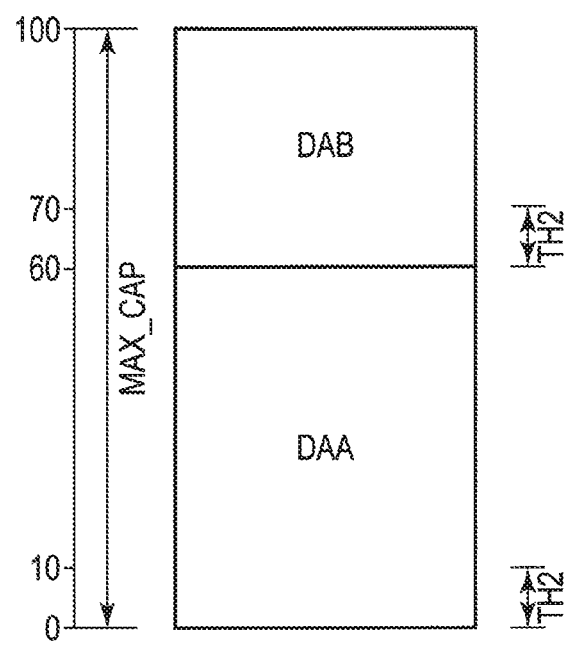
F I G. 10

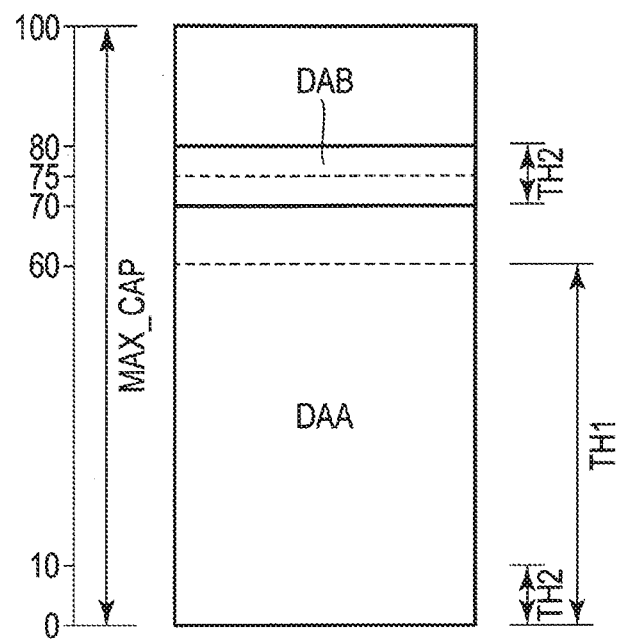
F I G. 12
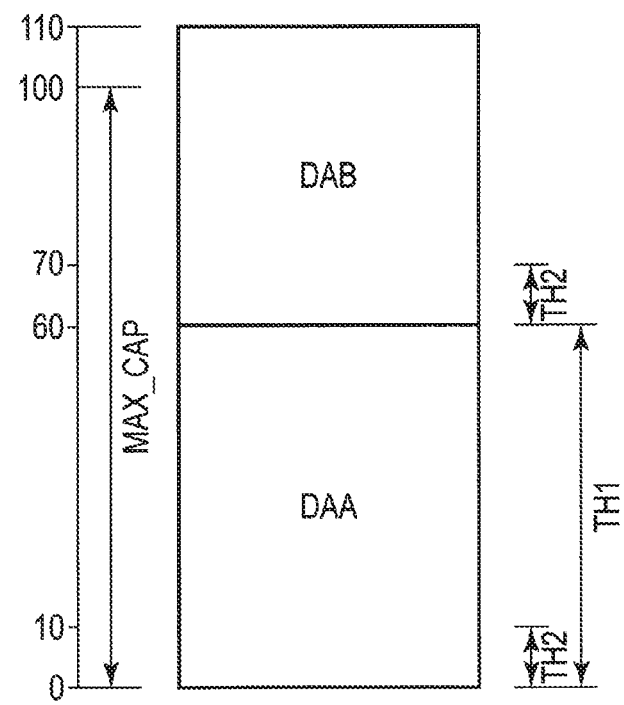
F I G. 13

MAGNETIC DISK DEVICE AND MEMORY MANAGEMENT METHOD OF MAGNETIC DISK DEVICE

CROSS-REFERENCE TO RELATED APPLICATIONS

This application is based upon and claims the benefit of priority from Japanese Patent Application No. 2020-035744, filed Mar. 3, 2020, the entire contents of which are incorporated herein by reference.

FIELD

Embodiments described herein relate generally to a magnetic disk device and a memory management method of the magnetic disk.

BACKGROUND

In the magnetic disk device, data is temporarily written to the cache in order to improve the efficiency of random writing. The data written to the cache is saved in a nonvolatile memory such as a serial flash memory. When power is lost, power is supplied by, for example, the back electromotive force of the spindle motor, and cache data is saved in a power loss protection (PLP) buffer, which is one of the nonvolatile memories. This protects the data when the power is lost.

For example, when the amount of the data can be written to the PLP buffer with the processing thread of the write command received from the host, the hard disk controller (hereinafter referred to as an HDC) uses a serial-attached SCSI (SAS) to send response frames, thereby notifying the host of the completion of the write command. When the completion notification of the write command is made, even when the power is lost after the notification, the write data to be notified needs to be able to be read normally after the power is restored.

Since the capacity of the PLP buffer is finite, when write commands are executed with a plurality of processing threads, like a hard disk with a split actuator configuration, a magnetic disk device that has a plurality of logical unit numbers (LUNs) is required to efficiently share the PLP buffer with the write command processing threads in each LUN in case of power loss. The LUN is an identifier allocated to a plurality of independent logical block addressing (LBA) spaces in the magnetic disk device.

The embodiment of the present invention is to provide a magnetic disk device that can efficiently share the memory (PLP buffer) with the write command processing threads in each LUN even when it is a magnetic disk device having a plurality of independent LBA spaces (LUN) in one device, and the memory management method thereof.

BRIEF DESCRIPTION OF THE DRAWINGS

FIG. 1 is a schematic diagram showing an example of a schematic configuration of a magnetic disk device according to an embodiment.

FIG. 2 is a diagram showing an example of a schematic configuration of a system controller of the magnetic disk device according to the embodiment.

FIG. 3 is a flowchart showing an example of the buffer management process in the magnetic disk device according to a first embodiment.

FIG. 10 is a schematic diagram showing still another specific example of whether the command completion notification condition (adjustment data total amount determination condition) in the buffer management process in the magnetic disk device according to the second embodiment holds.

FIG. 12 is a schematic diagram showing a specific example of whether the command completion notification condition (adjustment data amount determination condition and adjustment data total amount determination condition) in the buffer management process in the magnetic disk, device according to the third embodiment holds.

FIG. 13 is a schematic diagram showing another specific example of whether the command completion notification condition (adjustment data amount determination condition and adjustment, data total amount determination condition) in the buffer management process in the magnetic disk device according to the third embodiment holds.

in the buffer management process in the magnetic disk device according to the modification of the first embodiment holds.

Figure 17:
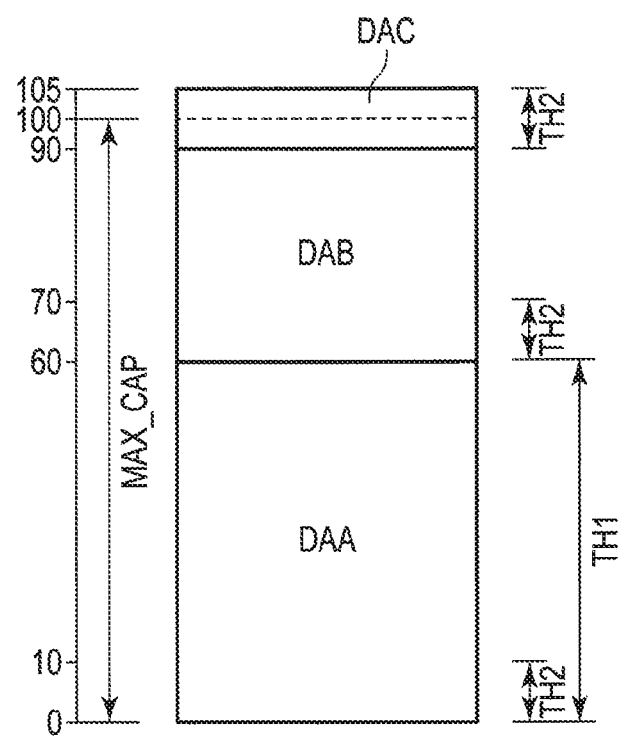

FIG. 17 is a schematic diagram showing a specific example of whether the command completion notification condition (adjustment data amount determination condition and adjustment data total amount determination condition) in the buffer management process in the magnetic disk device according to the modification of the third embodiment holds.

DETAILED DESCRIPTION

In general, according to one embodiment, a magnetic disk device includes a magnetic disk, an actuator that writes data to the magnetic disk, a nonvolatile memory that saves the data that is not written to the magnetic disk, a controller that, controls the actuator and the nonvolatile memory, where the controller executes a write command for instructing the writing of the data to the magnetic disk, where the write command is transmitted from a host, where the controller notifies the host of execution completion of the write command. The controller determines a first determination condition of whether a total value of an amount of the data for which execution completion has not been notified in one processing thread that executes the write command, where the data that has not been written to the magnetic disk, and an amount of the data for which execution completion has been notified in another processing thread that executes the write command, where the data has not been written to the magnetic disk, is less than or equal to a capacity of the nonvolatile memory holds. When the first determination condition holds, the controller notifies the host of execution completion of the write command in the one processing thread.

Hereinafter, the magnetic disk device according to the embodiments will be described with reference to FIGS. 1 to 17.

First Embodiment

FIG. 1 is a schematic diagram showing an example of a configuration of a magnetic disk device 1 according to the first embodiment. FIG. 1 shows a dual-actuator type magnetic disk device 1 including a plurality of (two as an example) actuators.

The magnetic disk device 1 includes a head disk assembly (hereinafter referred to as an HDA) 2, driver ICs 3a and 3b, head amplifier integrated circuits (hereinafter referred to as a head amplifier IC) 4a and 4b, a volatile memory (hereinafter referred to as a buffer) 5, a nonvolatile memory 6, a system controller (a first controller) 7a, and a system controller (a second controller) 7b. Further, the magnetic disk device 1 is communicatively connected to a host 3.

The HDA 2 includes a magnetic disk (hereinafter simply referred to as a disk) 21, a spindle motor (hereinafter referred to as an SPM) 22, arms 23a and 23b, and voice coil motors (hereinafter referred to as a VCM) 24a and 24b.

The disk 21 is a magnetic recording medium having recording faces where, for example, one, of the faces, on which data is magnetically recorded. A recording area 21a that can be used by the user and a system area 21b in which information necessary for the system management is written are allocated to the recording area of the disk 21. The disk 21 is driven and rotated by the SFM 22. The SPM 22 is driven by electric power supplied from a power supply (hereinafter referred to as a main power supply) 9 of the magnetic disk device 1 via the driver IC 3a. The number of disks 21 may be plural. Further, the disk 21 may be provided with recording faces on both sides, and arms (heads) may be disposed corresponding to the respective recording faces.

The arm 23a and the VCM 24a constitute an actuator (hereinafter referred to as a first actuator). A head 25a is mounted on the arm 23a. The VCM 24a is driven by electric power supplied from the main power supply 9 via the driver IC 3a, and controls the movement of the arm 23a to position the head 25a at a target position on the disk 21. Similarly, the arm 23b and the VCM 24b constitute an actuator (hereinafter, referred to as a second actuator). A head 25b is mounted on the arm 23b. The VCM 24b is driven by electric power supplied from the main power supply 9 via the driver IC 3b, and controls the movement of the arm 23b to position the head 25b at a target position on the disk 21.

The heads 25a and 25b include a slider as a main body and includes read heads RHa and RHb and write heads WHa and WHb, respectively, mounted on the slider. The read heads RHa and RHb read data recorded in the data tracks on the disk 21. The write heads WHa and WHb write data to the disk 21. The heads 25a and 25b write data to the disk 21 in block units including at least one sector, and read data from the disk 21 in block units. The sector is a minimum unit of data read from the disk 21 or data written to the disk 21.

The driver IC 3a controls the drive of the SPM 22 and the VCM 24a according to the control from the system controller 7a (specifically, a CPU 71a described later). Further, the driver IC 3b controls the drive of the VCM 24b according to the control from the system controller 7b (specifically, a CPU 71b described later).

The driver IC 3a includes a backup power supply unit 31. As described below, in the embodiment, the system controller 7a corresponds to a master (main) system-on-a-chip (SoC) of the magnetic disk device 1, and the system controller 7b corresponds to a slave (sub) SoC. The backup power supply unit 31 may be provided in the master (main) ScC, but may be provided in the slave (sub) SoC in addition to the master SoC.

The backup power supply unit 31 generates electric power in place of the main power supply 9 when the main power supply 9 of the magnetic disk device 1 is lost (cut off). That is, the backup power supply unit 31 generates power for executing the data protection process of the magnetic disk device 1 when the main power supply 9 is lost. The data protection process includes a power loss protection (PLP) process that secures write data ever when the main power supply 9 is lost. The PLP process is a process of storing data that has not been written (recorded) to the disk 21 at the time of loss of the main power supply 9 in the nonvolatile memory 6 described later. The generated power is supplied to the system controllers 7a and 7b, the buffer 5, and the nonvolatile memory 6. The backup power supply unit 31 uses the back electromotive force of the SPM 22 to generate this power.

The driver IC 3a includes a monitoring unit 32 that monitors the supply status of the voltage from the main power supply 9. The voltage (supply voltage) supplied from the main power supply 9 is a voltage of supply power for driving the actuators (the arms 23a and 23b and the VCMs 24a and 24b) by the driver ICs 3a and 3b.

The head amplifier ICs 4a and 4b include a read amplifier and a write driver. The read amplifier amplifies a read signal read from the disk 21 to output it to the system controllers 7a and 7b (specifically, HDCs 74a and 74b described later).

The write driver outputs a write current according to the write data output from the HDCs 74a and 74b to the heads 25a and 25b.

The buffer 5 is a semiconductor memory that temporarily records data and the like transmitted and received between the magnetic disk device 1 and the host 8. The buffer 5 is, for example, a dynamic random access memory (DRAM), a static random access memory (SRAM), a synchronous dynamic random access memory (SDRAM), a ferroelectric random access memory (FeRAM), or a magneto resistive random access memory (MRAM). Part of the storage area of the buffer 5 is used as a volatile cache 5a. The volatile cache 5a is a storage area in which the write data written to the disk 21 is temporarily stored. Another part of the storage area of the volatile memory 5 stores data necessary for processing in respective units of the magnetic disk device 1.

The nonvolatile memory 6 is a semiconductor memory that records data stored even when power supply is cut off. The nonvolatile memory 6 is, for example, a NOR type or NAND type flash read only memory (FROM)). Part of the storage area of the nonvolatile memory 6 is used as a system area 6a. An initial program loader (IPL) is stored in advance in part of the system area 6a. The CPUs 71a and 71b described later loads at least part of the control program stored in the disk 21 into control memories 75a and 75b described later, for example, by performing the IPL when the main power supply 9 is turned on.

Another part of the storage area of the nonvolatile memory 6 is used as a nonvolatile cache 6b. The nonvolatile cache 6b is a memory used for temporarily storing data that is written to the volatile cache 5a, but that has not yet been written (recorded) to the disk 21 (hereinafter referred to as unwritten data) until it is written to the disk 21. The data stored in the nonvolatile cache 6b is deleted when written to the disk 21. In the PLP process executed when the main power supply 9 is lost, the nonvolatile cache 6b is used as a storage area in which unwritten data left in the volatile cache 5a at the time of power loss is saved from the volatile cache 5a. Hereinafter, the nonvolatile cache 6b will be described as a PLP buffer 6b.

The system controllers 7a and 7b are realized by using, for example, a large scale integrated circuit (LSI) called SoC in which a plurality of elements is integrated in a single chip. The system controller 7a is a controller that controls the first actuator (the arm 23a and the VCM 24a), the driver IC 3a, the head amplifier IC 4a, the buffer 5, and the nonvolatile memory 6. The system controller 7b is a controller that controls the second actuator (the arm 23b and the VCM 24b), the driver IC 3b, and the head amplifier IC 4b.

FIG. 2 is a diagram showing an example of a schematic configuration of the system controllers 7a and 7b. The system controller 7a and the system controller 7b have the same configuration. The system controller 7a corresponds to the master (main) ScC of the dual-actuator type magnetic disk device 1. The system controller 7b corresponds to the slave (sub) SoC of the dual-actuator type magnetic disk device 1.

As shown in FIG. 2, these system controllers 7a and 7b includes the CPUs 71a and 71b, buffer control units 72a and 72b, data communication circuits 73a and 73b, hard disk controllers (hereinafter referred to as an HOC) 74a and 74b, and the control memories 75a and 75b, respectively.

The system controller 7a is connected to the driver IC 3a, the head amplifier IC 4a, the buffer 5, the nonvolatile memory 6, the system controller 7b, and the host 6. On the other hand, the system controller 7b is connected to the driver IC 3b, the head amplifier IC 4b, and the system controller 7a. The system controller 7a and the system controller 7b are connected by a communication path C. The communication path C is a communication path capable of high-speed data transfer.

The CPU 71a and the CPU 71b are main controllers that control respective units of the magnetic disk device 1. The CPUs 71a and 71b control the rotation speed of the SPM 22 via the driver ICs 3a and 3b, control the VCK 24a and 24b, and perform servo control of positioning the heads 25a and 25b. At the time of reading data (at the time of executing a read command), the CPUs 71a and 71b control the operation of reading data from the disk 21 and the process of the read data. At the time of writing data (at the time of executing a write command), the CPUs 71a and 71b control the operation of writing data to the disk 21, and select the save destination of the write data transferred from the host 6. The CPUs 71a and 71b are connected to the driver ICs 3a and 3b, the HDCs 74a and 74b, and the control memories 75a and 75b, respectively.

When the main power supply 9 is turned on, the CPUs 71a and 71b execute the IPL from the system area 6a of the nonvolatile memory 6, and loads the control program stored in the disk 21 into the control memories 75a and 75b. As a result, the CPUs 71a and 71b execute the process for operating the system controllers 7a and 7b m a predetermined operation mode. As an example, the CPU 71a causes the system controller 7a to function as a master (main) SoC, and the CPU 71b causes the system controller 7b to function as a slave (sub) SoC.

The buffer control units 72a and 72b control data transfer between the buffer 5 and the system controllers 7a and 7b. In the embodiment, as an example, the system controller 7b functions as a slave (sub) SoC, so that the function of the buffer control unit 72b is disabled.

The data communication circuits 73a and 73b mutually connect the system controller 7a and the system controller 7b via the communication path C, and control transmission/reception of data between them.

The HDCs 74a and 74b execute signal processing of read data and write data according to instructions from the CPUs 71a and 71b. The HDCs 74a and 74b have a circuit or a function for measuring the signal quality of read data. For example, the HDCs 74a and 74b have a function of performing an error checking and correcting (ECC) process on read data read from the disk 21. The HDCs 74a and 74b are connected to the head amplifier ICs 4a and 4b and the CPUs 71a and 71b. In this embodiment, since the system controller 7a functions as a master (main) SoC, the HDC 74a receives the read command and the write command from the host 8 according to the instruction from the CPU 71a, and controls data transfer to and from the host 8. The HDC 74a is connected to the nonvolatile memory 6.

The control memories 75a and 75b are volatile memories such as the DRAM. Part of the control program is loaded in the storage areas of the control memories 75a and 75b. In addition, management tables 78a and 73b are stored in the storage areas of the control memories 75a and 75b. The management tables 76a and 76b include volatile cache directory information and PLP buffer directory information. The volatile cache directory information is information for managing the location of data in the volatile cache 5a in units of blocks of a fixed size. The PLP buffer directory information is information for managing the location of data in the PLP buffer 6b in units of blocks of a fixed size. Further, part of the storage areas of the control memories 75a and 75b are used as command buffers 77a and 77b. The command buffers 77a and 77b store a queue of read commands and write commands received from the host 3. The read command and the write command are executed in the order of the queue with the processing thread corresponding to each command, for example.

The system controllers 7a and 7b operate as follows when reading and writing data from and to the disk 21. At this time, communication with the host 3 is controlled by the system controller 7a, which is a master (main). As described below, the first data is data that is written to or read from the disk 21 by using the head 25a and the second data is data that is written to or read from the disk 21 by using the head 25b.

When receiving, from the host 8, a read command instructing the reading of the read data from the disk 21, the system controller 7a divides the read data into the first data and the second data based on the instruction of CPU 71a, and notifies the CPU 71b of the information related to the second data via the communication path C. The CPU 71a stores the first data in the buffer 5 via the head amplifier IC 4a, the HOC 74a, and the buffer control unit 72a. The CPU 71b stores the second data in the buffer 5 via the head amplifier IC 4b, the HOC 74b, the data communication circuit 73b, the communication path C, the data communication circuit 73a, and the buffer control unit 72a. Then, the CPU 71a performs control 30 as to transmit, to the host 8, the first data and the second data stored in the buffer 5.

Further, when receiving, from the host 8, a write command instructing the writing of write data to the disk 21, the system controller 7a stores the write data in the buffer 5 (the volatile cache 5a) via the buffer control unit 72a. The CPU 71a divides the write data into the first data and the second data, and notifies the CPU 71b of the information regarding the second data via the communication path C. The CPU 71a writes (records) the first data from the volatile cache 5a to the disk 21 via the buffer control unit 72a, the HDC 74a, and the head amplifier IC 4a. In contrast, the CPU 71b writes the second data (recorded) from the volatile cache 5a to the disk 21 via the buffer control unit 72a, the data communication circuit 73a, the communication path C, the data communication circuit 73b, the HDC 74b, and the head amplifier IC 4b.

The condition for separating the read data or the write data into the first data and the second data may be, for example, based on separation which is performed in track units, head units, or disk units when writing or reading data, or separation into the data processed in main and the data processed in background.

Next, a method of managing the PLP buffer 6b for data protection process including the PLP process in the magnetic disk device 1 according to the embodiment will be described.

In this embodiment, the two logical unit numbers (LUNs) are allocated to the magnetic disk device 1. The LUN is an identifier allocated in the magnetic disk device 1 so as to correspond to a plurality of independent logical block addressing (LBA) spaces. The first actuator, in short, the system controller 7a executes the writing of write data with a write command processing thread in one LUN (hereinafter, referred to as a LUNA). In contrast, the second actuator, in snort, the system controller 7b executes the writing of write data with a write command processing thread in the other LUN (referred to as an LUNB). That is, the LUNA corresponds to an identifier associated with the system controller 7a, and the LUNB corresponds to an identifier associated with the system controller 7b. At a point in time when the write command is being executed, the processing thread in which the write command is being executed and the LUN uniquely correspond.

FIG. 3 is a flowchart showing a management method of the PLP buffer 6b in the data protection process. Specifically, a series of processing (hereinafter referred to as the buffer management process) executed when reserving a storage area of the write data in the PLP buffer 6b in the two LUNA and LUNB is shewn.

As shown in FIG. 3, in the buffer management process, the system controller 7a detects whether a write command is received from the host 8 (S101). At this time, the CPU 71a determines whether the HOC 743 has received the write command from the host 8.

When the write command has not been received, the system controller 7a ends the buffer management process.

In contrast, when the write command is received, the CPU 71a stores the write data in the buffer 5 (the volatile cache 5a) with the processing thread of the write command (S102).

Next, the CPU 71a acquires data (determination parameter) necessary for determining the command completion notification condition (S103). The command completion notification condition is a determination condition of whether the host 8 can be notified that the write command has been normally executed. Hereinafter, this notification is referred to as a command completion notification. The determination parameters are various values indicating the correlation with the PLP buffer 6b and the LUN. Here, the two determination parameters are the unwritten data amount in the write command processing thread and the total value of the unwritten data amount (hereinafter referred to as the unwritten data total amount).

The unwritten data amount is the LUN that is currently executing the write command (hereinafter referred to as the target LUN). In the case of the LUNA, as an example, this is the amount of write data for which the storage area of the PLP buffer 6b is attempted to be reserved. In other words, in the write command processing thread that is attempting to make notification of the completion (currently command completion notification has not been made), this is the amount of write data for which it is not yet determined that the writing (saving) to the PLP buffer 6b is possible. In addition, the LUN for which the write command is already executed is hereinafter referred to as the non-target LUN. In the case of the LUNB, as an example, this is the amount of write data for which the storage area of the PLP buffer 6b is already reserved. In other words, in the write command processing thread that has already made notification of the completion of the write command (currently command completion notification has been made), this is the amount of write data that has not been written (recorded) to disk 21, and for which it is determined that the writing (saving) to the PLP buffer 6b is possible.

The non-target LUN is the LUNB as an example, but includes the LUNA in the following case. For example, this is the case where the command completion notification has already been made, but write data has not been written (recorded) to the disk 21 yet with the LUNA processing thread that has executed a write command different from the write command currently being executed in LUNA, so that there is the write data for which the storage area of the PLP buffer 6b is reserved. In this case, the unwritten data amount of the processing thread in the remaining LUNA of the PLP buffer 6b is also added to the unwritten data total amount.

The unwritten data total amount is the total amount of the unwritten data amount in the target LUN and the unwritten data amount in the non-target LUN. That is, the unwritten data total amount is the total amount of, in all LUNs (LUNA and LUNB in this embodiment), the amount of write data which has not been written (recorded) to disk 21 although the command completion notification has already been made, and for which the storage area of the PLP buffer 6b is reserved, and the unwritten data amount of the target LUN.

In other words, the PLP buffer 6b is in a state where a storage area in which the write data of the unwritten data total amount can be written is reserved. Therefore, the PLP buffer 6b has a storage area in which the write data can be written (saved) by a capacity obtained by subtracting the unwritten data total amount from the buffer capacity. The buffer capacity is a storage capacity capable of writing the write data to the PLP buffer 6b to the maximum. For example, it is set as the maximum value of the storage capacity that can be written (saved) within the time during which the operation is allowed by the back electromotive force of the SPM 22.

The unwritten data amount and the unwritten data total amount are calculated, for example, by the block address given to the storage area of the PLP buffer 6b, in other words, the number of blocks. The block address information (SVSC) of the PLP buffer 6b corresponding to the write data written (recorded) to the disk 21 is given from the driver ICs 3a and 3b to the CPUs 71a and 71b. The unwritten data amount with the write command processing thread in each LUN is calculated as the number of blocks corresponding to the difference between the final block address of the write command and the block address corresponding to the write data written to the disk 21.

When the write data is written to the disk 21 with the write command processing thread, the storage area that can be reserved in the PLP buffer 6b is released by the amount, of the write data. Therefore, when the unwritten data amount is negative, it means that the write data was written to the disk 21 in the number of blocks corresponding to the write data amount or more with the write command processing thread. That is, in this case, the writing of the write data to the disk 21 is completed, and the value of the unwritten data amount by the corresponding write command is set to 0 (zero).

When acquiring the determination parameter, the CPU 71a determines the command completion notification condition based on the determination parameter. Here, the unwritten data total amount determination condition (first determination condition) and the unwritten data amount determination condition (second determination condition) are determined as the command completion notification conditions. As an example, the unwritten data amount determination condition is first determined (S104), and then the unwritten data total amount determination condition is determined (S105). The determination order of these determination conditions may be reversed.

The unwritten data amount determination condition is a determination condition of whether the unwritten data amount of the target LUN is less than or equal to the maximum occupiable capacity. The maximum occupiable capacity is the maximum value of the storage area, of the PLP buffer 6b, that can be occupied by one LUN. In determining the unwritten data amount determination condition, the CPU 71a compares the unwritten data amount of the target LUN with the maximum occupiable capacity. When the unwritten data amount of the target LUN is less than or equal to the maximum occupiable capacity, the CPU 71a determines that the unwritten data amount determination condition holds. On the other hand, when the unwritten data amount of the target LUN exceeds the maximum occupiable capacity, the CPU 71a determines that the unwritten data amount determination condition does not hold. However, whether the unwritten data amount determination condition when the unwritten data amount matches the maximum occupiable capacity holds may be opposite to the above.

When the unwritten data amount determination condition holds, the CPU 71a determines the unwritten data total amount determination condition (S105). The unwritten data total amount determination condition is a determination condition of whether the unwritten data total amount is less than or equal to the buffer capacity. In determining the unwritten data total amount determination condition, the CPU 71a compares the unwritten data total amount with the buffer capacity. When the unwritten data total amount is less than or equal to the buffer capacity, the CPU 71a determines that the unwritten data total amount determination condition holds. On the ocher hand, when the unwritten data total amount exceeds the buffer capacity, the CPU 71a determines that the unwritten data total amount determination condition does not hold. However, whether the unwritten data total amount determination condition when the unwritten data total amount matches the buffer capacity holds may be opposite to the above.

When the unwritten data total amount determination condition holds, the CPU 71a determines that the write command for the target LUN is complete, and sends a command completion notification to the host 8 via the HOC 74a (S106). In this case, a storage area in which write data can be written with the write command processing thread in the target LUN is left in the PLP buffer 6b, and the write data can be written to the PLP buffer 6b. Therefore, it is possible to notify the host 8 of the command completion notification, that is, that the write command has been completed normally.

In contrast, when the unwritten data amount determination condition does not hold in S104, or when the unwritten data total amount determination condition does not hold in S105, the CPU 71a performs an unsatisfied process (S107). In this case, the storage area in which the write data can be written with the write command processing thread in the target LUN is not left in the PLP buffer 6b. Therefore, the write command for the target LUN is not completed, and the CPU 71a does not send the command completion notification to the host 8. Instead, as the unsatisfied process, for example, a timeout process that ends the buffer management process after a predetermined time has elapsed, a retry process for ending the buffer management process when the command completion notification condition (unwritten data amount determination condition and unwritten data total amount determination condition) does not hold even after repeating the determination by a predetermined number of times, a process combining these processes, and the like are performed. It is possible to omit the unsatisfied process and the buffer management process may be ended when the command completion notification condition does not hold.

Figure 4:
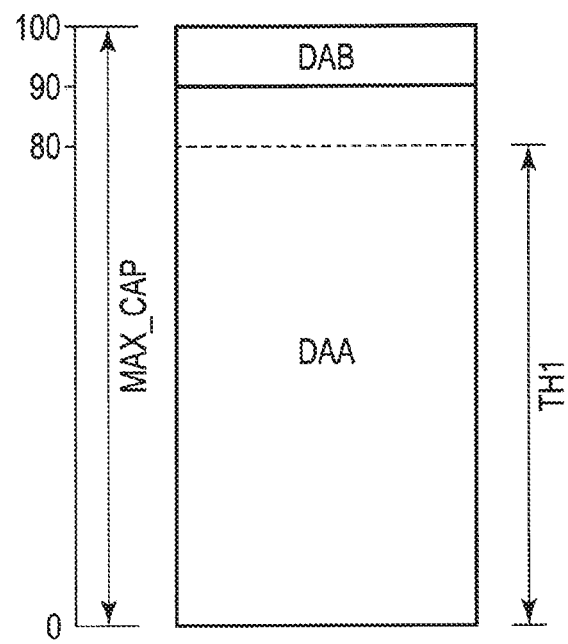
FIG. 4 is a schematic diagram showing a specific example of whether the command completion notification condition (unwritten data amount determination condition and unwritten data total amount determination condition) in the buffer management process in the magnetic disk device according to the first embodiment holds.
Figure 5:
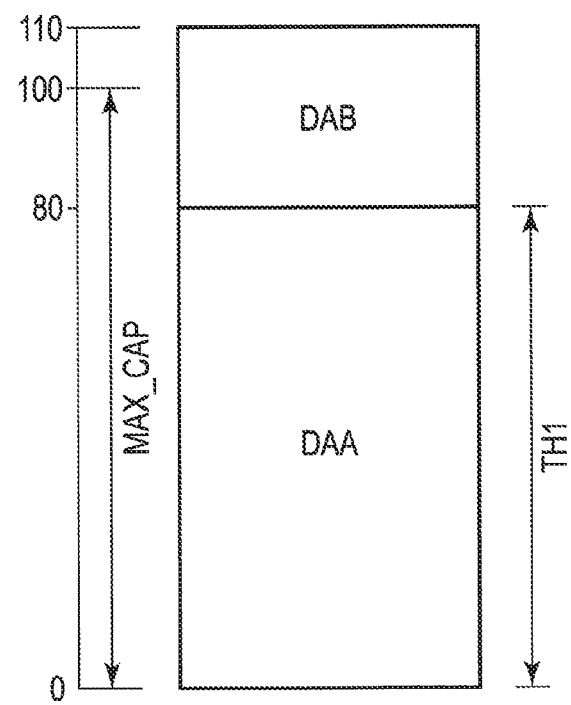
FIG. 5 is a schematic diagram showing another specific example of whether the command completion notification condition (unwritten data amount determination condition and unwritten data total amount determination condition) in the buffer management process in the magnetic disk device according to the first embodiment holds.
Figure 6:
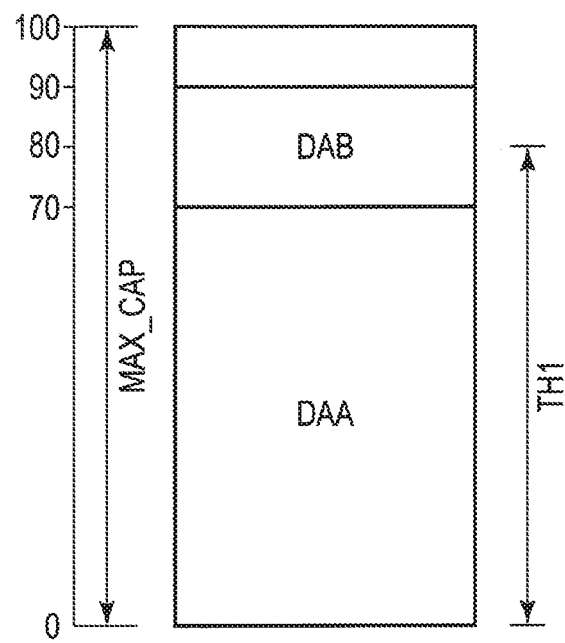
FIG. 6 is a schematic diagram showing still another specific example of whether the command completion notification conditions (unwritten data amount determination condition and unwritten data total amount determination condition) in the buffer management process in the magnetic disk device according to the first embodiment holds.

FIGS. 4 to 6 show specific examples of whether the command completion notification is made in the buffer management process shown in FIG. 3, that is, whether the command completion notification conditions (the unwritten data amount determination condition and the unwritten data total amount determination condition) hold. In the examples shown in FIGS. 4 to 6, PLP buffer 6b has a buffer capacity (MAX_CAP) of 100, and a maximum occupiable capacity (TH1) of 80. The target LUN is the LUNA, and the non-target LUN is the LUNB. That is, the LUNA is currently attempting to issue a command completion notification by reserving a storage area of the write data in the PLP buffer 6b with a write command processing thread. On the other hand, in the LUNB, a storage area of the write data is already reserved in the PLP buffer 6b with a write command processing thread different from that of the LUNA, and the command completion notification is made.

In the example shown in FIG. 4, a storage area of the write data is already reserved in the PLP buffer 6b with a write command processing thread in the LUNB, and the unwritten data amount (DAB) is 10. The DAB is the unwritten data amount of the LUNB, which is a non-target LUN, and the amount of write data that has not been written (recorded) to disk 21, and for which the storage area of the PLP buffer 6b remains to be reserved without released although the command completion notification has already been made. On the other hand, the unwritten data amount (DAA) of the LUNA, which is the target LUN, is 90. The DAA is the unwritten data amount of the LUNA, which is the target LUN, and the amount of write data for which the command completion notification has not been given yet, and for which the storage area of the PLP buffer 6b is attempted to be reserved.

The maximum occupiable capacity (TH1) is 80. Since the unwritten data amount (DAA) of the LUNA exceeds the value, that is, DAA>TH1, the unwritten data amount determination condition does not hold. In other words, the storage area of the write data cannot be reserved in the PLP buffer 6b with the write command processing thread in the LUNA, which is the target LUN. As a result, the LUNA command completion notification cannot be sent to the host 8.

In this case, the unwritten data total amount is 100, which is the unwritten data amount (10+90) obtained by adding the DAA to the DAB. Therefore, since the unwritten data total amount is less than or equal to the buffer capacity (MAX_CAP), that is, DAA+DAB≤MAX_CAP, the unwritten data total amount determination condition holds. However, since the unwritten data amount determination condition does not hold as described above, the command completion notification condition does not hold, and the LUNA command completion notification cannot be sent to the host 8.

In the example shown in FIG. 5, the unwritten data amount (DAB) of the LUB is 30. On the other hand, the unwritten data amount (DAA) of the LUNA is 80. Therefore, since the unwritten data amount (DAA) of the LUNA is less than or equal to the maximum occupiable capacity (TH1), that is, DAA≤TH1, the unwritten data amount determination condition holds.

On the other hand, the unwritten data total amount (DAA+DAB) is 110. Therefore, since the unwritten data total amount (DAA+DAB) exceeds the buffer capacity (MAX_CAP), that is, DAA+DAB>MAX_CAP, the unwritten data total amount determination condition does not held. In this case, the PLP buffer 6b does not have any storage area in which the write data of the unwritten data amount (DAA) of the LUNA can be written (saved). In other words, the storage area of the write data cannot be reserved in the PLP buffer 6b with the write command processing thread in the LUNA, which is the target LUN.

In this way, in the example shown in FIG. 5, the unwritten data amount determination condition holds, but the unwritten data total amount determination condition does not hold, so that the command completion notification condition does not hold and the LUNA command completion notification cannot be sent to the host 6.

In the example shown in FIG. 6, the unwritten data amount (DAB) of the LUB is 20. On the other hand, the unwritten data amount (DAA) of the LUNA is 70. Therefore, the unwritten data amount (DAA) of the LUNA is less than or equal to the maximum occupiable capacity (TH1), that is, DAA≤TH1, and the unwritten data amount determination condition holds.

On the other hand, the unwritten data total amount (DAA+DAB) is 90. Therefore, since the unwritten data total amount (DAA+DAB) is less than or equal to the buffer capacity (MAX_CAP), that is, DAA+DAB≤MAX_CAP, the unwritten data total amount determination condition holds. In this case, the PLP buffer 6b has a storage area in which the write data of the unwritten data amount (DAA) of the LUNA can be written (saved). In other words, the storage area of the write data can be reserved in the PLP buffer 6b with the write command processing thread in the LUNA, which is the target LUN.

In this way, in the example shown in FIG. 6, since both the unwritten data amount determination condition and the unwritten data total amount determination condition hold, the command completion notification condition holds, and the LUNA command completion notification can be sent to the host 8.

In the first embodiment described above, although the unwritten data amount determination condition and the unwritten data total amount determination condition are used as the write command completion notification condition, the command completion notification condition is not limited to this. For example, the adjustment data total amount, determination condition described below may be used as the command completion notification condition. An embodiment in which the adjustment data total amount determination condition is used as the command completion notification condition in this way will be described below as a second embodiment. The configuration of the magnetic disk device of the second embodiment is equivalent to the configuration of the magnetic disk device 1 of the first embodiment shown in FIGS. 1 and 2.

Second Embodiment

Figure 7:
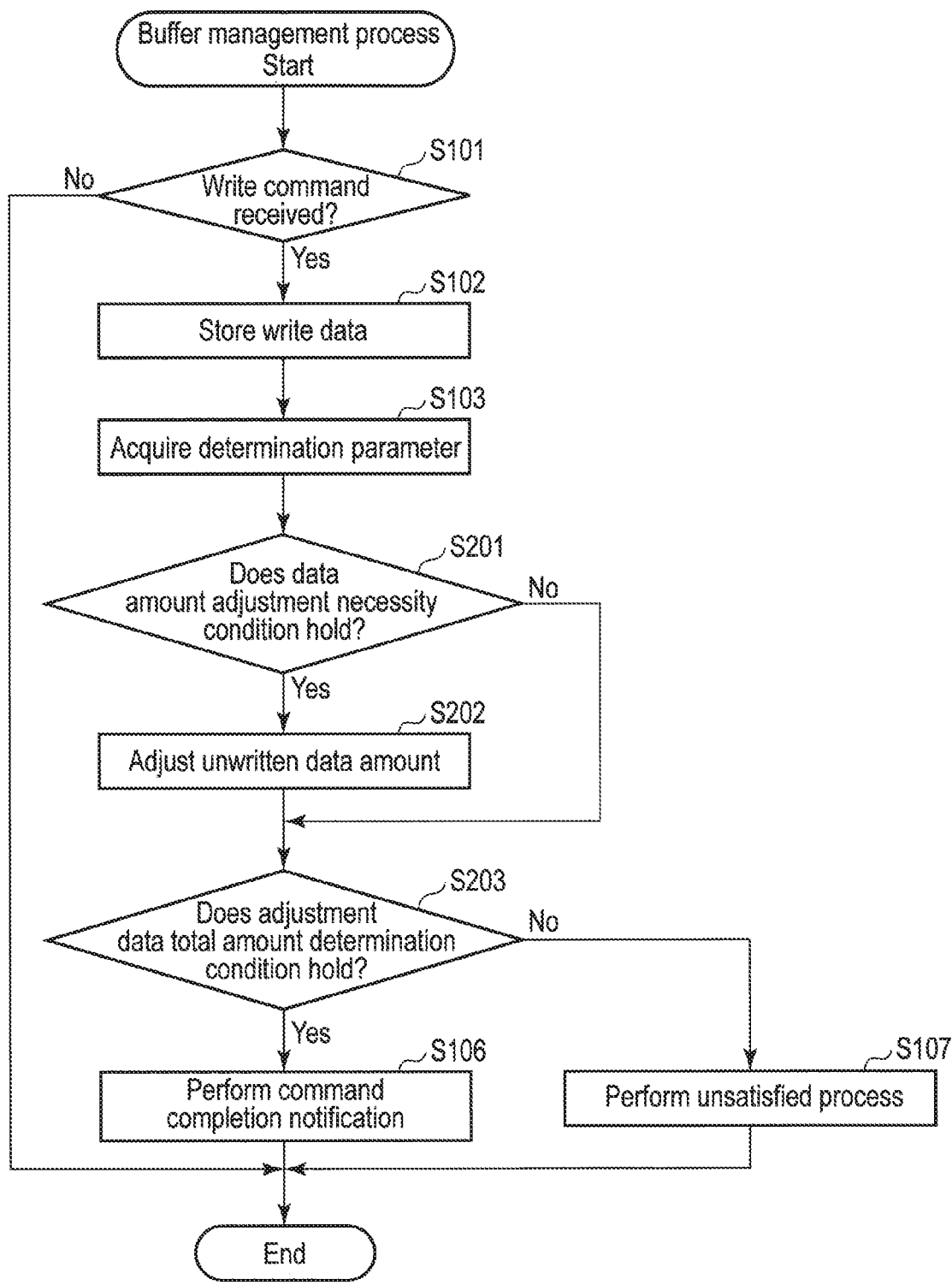
FIG. 7 is a flowchart shewing an example of the buffer management process in the magnetic disk device according to a second embodiment.

FIG. 7 is a flowchart showing an example of the buffer management process in this embodiment. Whether the command completion notification condition (adjustment data total amount determination condition) in the buffer management process holds will be described below with reference to the flowchart shown in FIG. 7. The control flow of the buffer management process of the present embodiment replaces part of the control flow of the first embodiment (FIG. 3) with control unique to the second embodiment. Therefore, with respect to the control equivalent to that of the above-described first embodiment, the same step numbers are given and the description thereof is omitted, and only the control unique to the second embodiment will be described.

As shown in FIG. 7, in the buffer management process, when the write command is received (S101) and the write data is stored in the buffer 5 (volatile cache 5a) with the write command processing thread (S102), a CPU 71a acquires the determination parameter (S103). The determination parameters are the unwritten data amount and the unwritten data total amount.

In the present embodiment, the unwritten data amount is adjusted (corrected) as necessary. Therefore, the CPU 71a determines the data amount adjustment necessity condition (S201). The data amount adjustment necessity condition is a determination condition of whether the unwritten data amount needs to be adjusted. In determining the data amount adjustment necessity condition, the CPU 71a compares the unwritten data amount of each LUN with the occupation reserved capacity. The occupation reserved capacity is a capacity value of the storage area, of a PLP buffer 6b, that one LUN is allowed to occupy without fail. That is, in the PLP buffer 6b, the storage area of the occupation reserved capacity is reserved in advance as the storage area that each of the LUNs is allowed to occupy according to the number of the LUNs. The occupation reserved capacity may be a constant value for all LUNs, but may be a unique value set for each LUN or a variable value. When the unwritten data amount is less than the occupation reserved capacity, the CPU 71a determines that the data amount adjustment necessity condition holds. On the other hand, when the unwritten data amount is equal to or larger than the occupation reserved capacity, the CPU 71a determines that the data amount adjustment necessity condition does not held.

The occupation reserved capacity (TH2) has a relationship with the maximum occupiable capacity (TH1) and the buffer capacity (MAX_CAP) as shown by the following two relational expressions. The first relational expression is represented by TH2≤TH1. The second relational expression is represented by TH1+(n−1)*TH2≤MAX_CAP. In the second relational expression, n is the total number of the LUNs. As described above, the buffer capacity is a fixed value set as the maximum value of the storage capacity that can be written (saved) within the time during which the operation is allowed by the back electromotive force of an SPM 22, for example. The occupation reserved capacity and the maximum occupiable capacity are set based on the buffer capacity set according to the back electromotive force so that both the first relational expression and the second relational expression hold. In other words, the occupation reserved capacity and the maximum occupiable capacity can be set to optimal values based on the buffer capacity under the condition that both the first relational expression and the second relational expression hold.

When the data amount adjustment necessity condition holds, the CPU 71a adjusts (corrects) the value of the unwritten data amount of the LUN to the value of the occupation reserved capacity (S202). In this case, since the unwritten data amount is currently less than the occupation reserved capacity, it is necessary to reserve the storage area of the PLP buffer 6b up to the occupation reserved capacity in preparation for the future writing (saving) of the write data with the processing thread of the LUN. Therefore, the value of the unwritten data amount, of the LUN, which is currently less than the occupation reserved capacity is adjusted to the value of the occupation reserved capacity. When the unwritten data amount is adjusted, the unwritten data total amount is calculated using the value of the unwritten data capacity after adjustment.

On the other hand, when the data amount adjustment necessity condition does not hold in S202, the CPU 71a does not adjust (correct) the value of the unwritten data amount of the LUN. That is, since the unwritten data amount is currently equal to or larger than the occupation reserved capacity, it is not necessary to further reserve the storage area of the PLP buffer 6b for the write command processing thread in the LUN. Therefore, the unwritten data amount of the LUN which is currently less than the occupation reserved capacity is maintained as it is without being adjusted.

Subsequently, the CPU 71a determines the command completion notification condition based on the determination parameter. Here, the adjustment data total amount determination condition is determined as the command completion notification condition (S203).

The adjustment data total amount determination condition is a determination condition of whether the unwritten data total amount is less than or equal to the buffer capacity. However, when the unwritten data amount is adjusted, the value of the unwritten data amount of the LUN is set as the value after adjustment (after correction), and the unwritten data total amount is calculated. In determining the adjustment data total amount determination condition, the CPU 71a compares the unwritten data total amount with the buffer capacity. When the unwritten data total amount is less than or equal to the buffer capacity, the CPU 71a determines that the adjustment data total amount determination condition holds. On the other hand, when the unwritten data total amount exceeds the buffer capacity, the CPU 71a determines that the adjustment data total amount determination condition does net hold. However, whether the adjustment data total amount determination condition when the unwritten data total amount matches the buffer capacity holds may be opposite to the above.

When the adjustment data total amount determination condition holds, the CPU 71a determines that the write command for the target LUN is complete, and sends a command completion notification to a host 8 via an HDC 74a (S106).

On the other hand, when the adjustment data total amount determination condition does not hold in S203, the CPU 71a performs an unsatisfied process (S107). In this case, the write command for the target LUN is not completed, and the CPU 71a does not send the command completion notification to the host 8.

Figure 8:
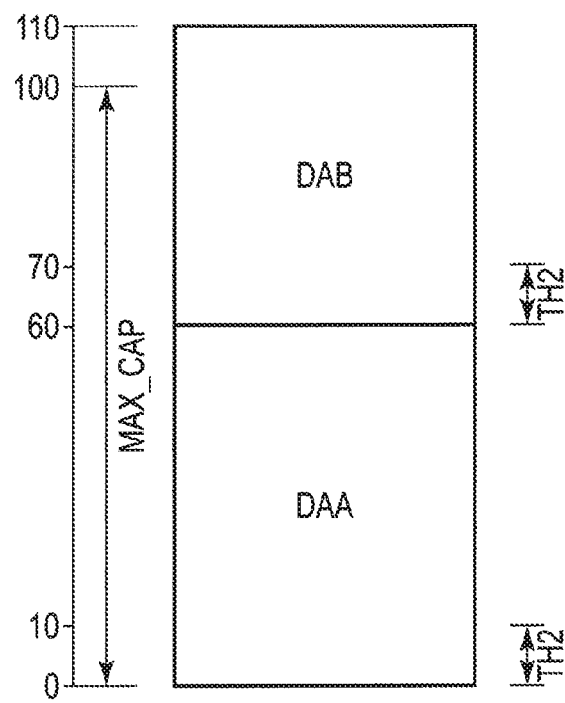
FIG. 8 is a schematic diagram showing a specific example of whether the command completion notification condition (adjustment data total amount determination condition) in the buffer management process in the magnetic disk device according to the second embodiment holds.
Figure 9:
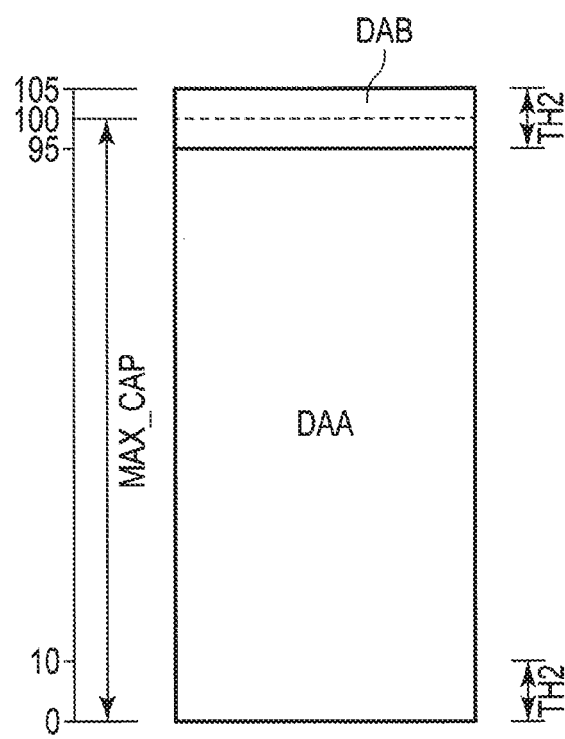
FIG. 9 is a schematic diagram showing another specific example of whether the command completion notification condition (adjustment data total amount determination condition) in the buffer management process in the magnetic disk device according to the second embodiment holds.

FIGS. 8 to 10 show specific examples of whether the command completion notification is made in the buffer management process shown in FIG. 7, that is, whether the command completion notification condition (adjustment data total amount determination condition) holds. In the example shown in FIGS. 8 to 10, the PLP buffer 6b has a buffer capacity (MAX_CAP) of 100, and an occupation reserved capacity (TH2) of 10. The target LUN is the LUNA, and the non-target LUN is the LUNB. That is, the LUNA is currently attempting to issue a command completion notification by reserving a storage area of the write data in the PLP buffer 6b with a write command processing thread. On the other hand, in the LUNB, a storage area of the write data is already reserved in the PLP buffer 6b with a write command processing thread different from that of the LUNA, and the command completion notification is made.

In the example shown in FIG. 8, a storage area of the write data is already reserved in the PLP buffer 6b with a write command processing thread in the LUNB, and the unwritten data amount (DAB) is 50. On the other hand, the unwritten data amount (DAA) of the LUNA, which is the target LUN, is 60. In this case, since the value of the unwritten data amount (DAA) of the LUNA and the value of the unwritten data amount (DAB) of the LUNB both exceed the occupation reserved capacity (TH2), they are maintained as they are without being adjusted (corrected).

The unwritten data total amount is 110, which is the actual unwritten data amount (50+60) obtained by adding the DAA to the DAB. Since the unwritten data total amount exceeds the buffer capacity (MAX_CAP), that is, DAA+DAB>MAX_CAP, the adjustment data total amount determination condition does not hold. In other words, the storage area of the write data cannot be reserved in the PLP buffer 6b with the write command processing thread in the LUNA, which is the target LUN. Therefore, the LUNA command completion notification cannot be sent to the host 8.

In the example shown in FIG. 9, the unwritten data amount (DAB) of the LUB is 5. In this case, since the value is less than the occupation reserved capacity (TH2), the value of the unwritten data amount (DAB) of the LUNB is adjusted (corrected) to the value of TH2 to be 10. On the other hand, the unwritten data amount (DAA) of the LUNA is 95. In this case, the value of the unwritten data amount (DAA) of the LUNA exceeds the occupation reserved capacity (TH2), and therefore is maintained as it is without adjustment.

The unwritten data total amount is 105, which is the unwritten data total amount (10+95) obtained by adding the actual DAA to the adjusted DAB. Since the unwritten data total amount exceeds the buffer capacity (MAX_CAP), that is, DAA+DAB>MAX_CAP, the adjustment data total amount determination condition does net hold. In ether words, the storage area of the write data cannot be reserved in the PLP buffer 6b with the write command processing thread in the LUNA, which is the target LUN. Therefore, the LUNA command completion notification cannot be sent to the host 8.

The actual (that is, before adjustment) unwritten data amount (DAB) of the LUNB is 5, so that when the actual value is used, the unwritten data total amount is 100 (5+95) and is less than or equal to the buffer capacity (MAX_CAP), that is, DAA+DAB≤MAX_CAP, whereby the adjustment data total amount determination condition holds. However, it is necessary to reserve the storage area of the PLP buffer 6b up to the occupation reserved capacity (TH2) in case the storage area of the write data with the LUNB processing thread is reserved in the future as described above. Therefore, the value of the unwritten data amount (DAB) of the LUNB is adjusted to the value of the occupation reserved capacity (TH2), and the adjustment data total amount determination condition does not hold.

In the example shown in FIG. 10, the unwritten data amount (DAB) of the LUB is 40. On the ether hand, the unwritten data amount (DAA) of the LUNA is 60. In this case, since the value of the unwritten data amount (DAA) of the LUNA and the value of the unwritten data amount (DAB) of the LUNB both exceed the occupation reserved capacity (TH2), they are maintained as they are without being adjusted (corrected).

The unwritten data total amount is 100, which is the actual unwritten data total amount (40+60) obtained by adding the DAA to the DAB. Since the unwritten data total amount is less than or equal to the buffer capacity (MAX_CAP), that is, DAA+DAB≤MAX_CAP, the adjustment data total amount determination condition holds. That is, the storage area of the write data can be reserved in the PLP buffer 6b with a write command processing thread in the LUNA, which is the target LUN, and the LUNA command completion notification can be sent to the host 8.

Further, in addition to the adjustment data total amount determination condition in the second embodiment, an adjustment data amount determination condition described later may be used as the command completion notification condition. An embodiment in which the command completion notification condition is the adjustment data amount determination condition and the adjustment data total amount determination condition in this manner will be described below as a third embodiment. The configuration of the magnetic disk device of the third embodiment is equivalent to the configuration of the magnetic disk device 1 of the first embodiment shown in FIGS. 1 and 2.

Third Embodiment

Figure 11:
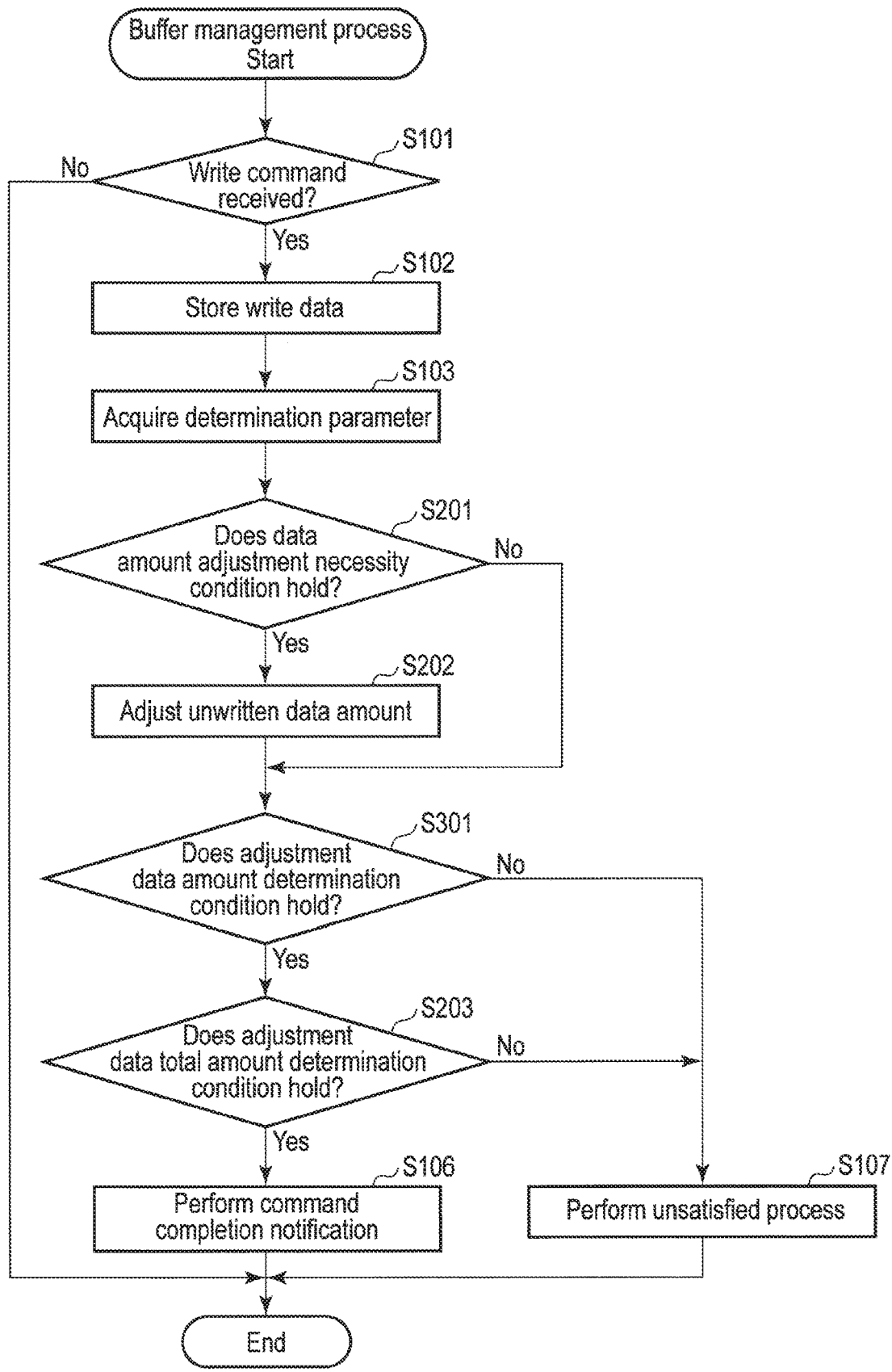
FIG. 11 is a flowchart showing an example of the buffer management process in the magnetic disk device according to a third embodiment.

FIG. 11 is a flowchart showing an example of the buffer management process in this embodiment. Whether the command completion notification conditions (adjustment data amount determination condition and adjustment data total amount determination condition) in the buffer management process holds will be described below with reference to the flowchart shown in FIG. 11. The control flew of the buffer management process of the present embodiment replaces part of the control flow of the second embodiment (FIG. 7) with control unique to the third embodiment. Therefore, with respect to the control equivalent to that of the above-described second embodiment, the same step numbers are given and the description thereof is omitted, and only the control unique to the third embodiment will be described.

As shown in FIG. 11, in the buffer management process, when the write command is received (S101) and the write data is stored in the buffer 5 (volatile cache 5a) with the write command processing thread (S102), a CPU 71a acquires the determination parameter (S103). The determination parameters are the unwritten data amount and the unwritten data total amount.

Since the unwritten data amount is adjusted (corrected) as necessary, the CPU 71a determines the data amount adjustment necessity condition (S201).

When the data amount adjustment necessity condition holds, the CPU 71a adjusts (corrects) the value of the unwritten data amount of the LUN to the value of the occupation reserved capacity (S202). When the unwritten data amount is adjusted, the unwritten data total amount is calculated using the unwritten data capacity after adjustment. On the other hand, when the data amount adjustment necessity condition does not hold, the CPU 71a does not adjust (correct) the value of the unwritten data amount of the LUN. Therefore, the unwritten data amount of the LUN which is currently less than the occupation reserved capacity is maintained as it is without being adjusted.

Subsequently, the CPU 71a determines the command completion notification condition based on the determination parameter. Here, the adjustment data amount determination condition and the adjustment data total amount determination condition are determined as the command completion notification conditions. As an example, first, the adjustment data amount determination condition is determined (S301), and then the adjustment data total amount determination condition is determined (S203).

The adjustment data amount determination condition is a determination condition of whether the unwritten data amount of the target LUN is less than or equal to the maximum occupiable capacity. However, when the unwritten data amount is adjusted, the value of the unwritten data amount is a value after adjustment (correction). In determining the adjustment data amount determination condition, the CPU 71a compares the unwritten data amount of the target LUN with the maximum occupiable capacity. When the unwritten data amount of the target LUN is less than or equal to the maximum occupiable capacity, the CPU 71a determines that the adjustment data amount determination condition holds. On the other hand, when the unwritten data amount of the target LUN exceeds the maximum occupiable capacity, the CPU 71a determines that the adjustment data amount determination condition does not hold. However, whether the adjustment data amount determination condition when the unwritten data amount matches the maximum occupiable capacity holds may be opposite to the above.

When the adjustment data amount determination condition holds, the CPU 71a determines the adjustment data total amount determination condition (S203). When the adjustment data total amount determination condition holds, the CPU 71a determines that the write command for the target LUN is complete, and sends a command completion notification to a host 8 via an HOC 74a (S106).

In contrast, when the adjustment data amount determination condition does not hold in S301, or when the adjustment data total amount determination condition does not hold in S203, the CPU 71a performs an unsatisfied process (S107). In this case, the write command for the target LUN is net completed, and the CPU 71a does not send the command completion notification to the host 8.

Figure 14:
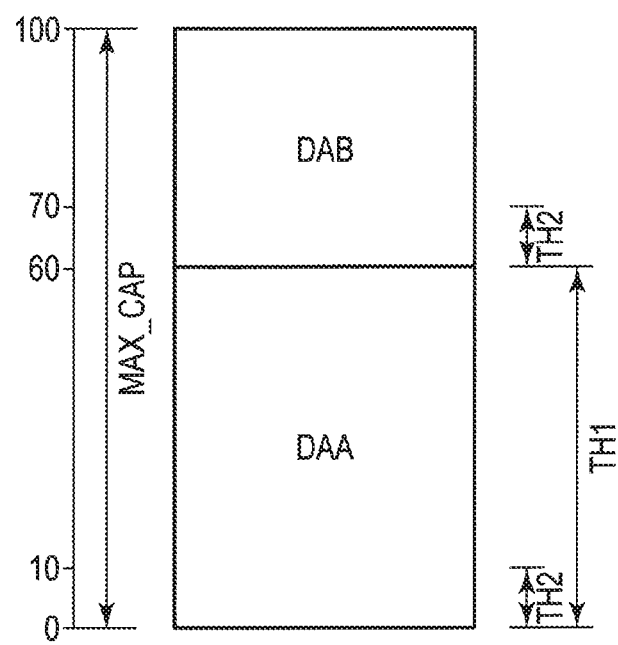
FIG. 14 is a schematic diagram showing still another specific example of whether the command completion notification condition (adjustment data amount determination condition and adjustment data total amount determination condition) in the buffer management process in the magnetic disk device according to the third embodiment holds.

FIGS. 12 to 14 show specific examples of whether command completion notification is made in the buffer management process shown in FIG. 11, that is, whether the command completion notification conditions (adjustment data amount determination condition and adjustment data total amount determination condition) hold. In the examples shown in FIGS. 12 to 14, a PLP buffer 6b has a buffer capacity (MAX_CAP) of 100, a maximum occupiable capacity (TH1) of 60, and an occupation reserved capacity (TH2) of 10. The target LUN is the LUNA, and the non-target LUN is the LUNB. That is, the LUNA is currently attempting to issue a command completion notification by reserving a storage area of the write data in the PLP buffer 6b with a write command processing thread. On the other hand, in the LUNB, a storage area of the write data is already-reserved in the PLP buffer 6b with a write command processing thread, and the command completion notification is made.

In the example shown in FIG. 12, the write data is already written to the PLP buffer 6b with a write command processing thread in the LUNB, and the unwritten data amount (DAB) is 5. In this case, since the value is less than the occupation reserved capacity (TH2), the value of the unwritten data amount (DAB) of the LUNB is adjusted (corrected) to the value of TH2 to be 10. On the other hand, the unwritten data amount (DAA) of the LUNA is 70. In this case, the value of the unwritten data amount (DAA) of the LUNA exceeds the occupation reserved capacity (TH2), and therefore is maintained as it is without adjustment.

Since the maximum occupiable capacity (TH1) is 60 and the unwritten data amount (DAA) of the LUNA exceeds the value, that is, DAA>TH1, the adjustment data amount determination condition does not hold. In other words, the storage area of the write data cannot be reserved in the PLP buffer 6b with the write command processing thread in the LUNA, which is the target LUN. Therefore, the LUNA command completion notification cannot be sent to the host 8.

In this case, the unwritten data total amount is 80, which is the data amount (10+70) obtained by adding the actual DAA to the adjusted DAB. Therefore, since the unwritten data total amount is less than or equal to the buffer capacity (MAX_CAP), that is, DAA+DAB≤MAX_CAP, the adjustment data total amount determination condition holds. However, since the adjustment data amount determination condition does not hold as described above, the command completion notification condition does not hold and the LUNA command completion notification cannot be transmitted to the host 8.

In the example shown in FIG. 13, the unwritten data amount (DAB) of the LUNB is 50. On the other hand, the unwritten data amount (DAA) of the LUNA is 60. In this case, since the value of the unwritten data amount (DAA) of the LUNA and the value of the unwritten data amount (DAB) of the LUNB both exceed the occupation reserved capacity (TH2), they are maintained as they are without being adjusted (corrected).

The unwritten data total amount is 110, which is the unwritten data total amount (50+60) after adjustment obtained by adding the DAA to the DAB. Since she unwritten data total amount exceeds the buffer capacity (MAX_CAP), that is, DAA+DAB>MAX_CAP, the adjustment data total amount determination condition does not hold. In other words, the storage area of the write data cannot be reserved in the PLP buffer 6b with the write command processing thread in the LUNA, which is the target LUN. Therefore, the LUNA command completion notification cannot be sent to the host 8.

In the example shown in FIG. 14, the unwritten data amount (DAB) of the LUB is 40. On the ether hand, the unwritten data amount (DAA) of the LUNA is 60. In this case, since the value of the unwritten data amount (DAA) of the LUNA and the value of the unwritten data amount (DAB) of the LUNB both exceed the occupation reserved capacity (TH2), they are maintained as they are without being adjusted (corrected).

Therefore, the unwritten data amount (DAA) of the LUNA is less than or equal to the maximum occupiable capacity (TH1), that is, DAA≤TH1, and the adjustment data amount determination condition holds.

On the other hand, the unwritten data total amount is 100, which is the actual unwritten data total amount (40+60) obtained by adding the DAA to the DAB. Therefore, since the unwritten data total amount is less than or equal to the buffer capacity (MAX_CAP), that is, DAA+DAB≤MAX_CAP, the adjustment data total amount determination condition holds.

In the example shown in FIG. 14, both the adjustment data amount determination condition and the adjustment data total amount determination condition hold, so that the command completion notification condition holds. That is, the storage area of the write data can be reserved in the PLP buffer 6b with a write command processing thread in the LUNA, which is the target LUN, and the LUNA command completion notification can be sent to the host 8.

Thus, according to the magnetic disk device 1 of the embodiment, depending on whether the command completion notification condition with the write command processing thread in the target LUN holds, a storage area, in the PLP buffer 6b, in which the write data is written (saved) can be reserved. Therefore, even when a plurality of the LUNs is included in one device, the PLP buffer 6b can be efficiently shared with the write command processing threads in respective LUNs.

For example, when many write commands are sent to one LUN, and the unwritten data amount with the processing thread for these write commands reaches the buffer capacity, there is a possibility in the related art that the write data of the unwritten data amount with the write command processing thread in another LUN cannot be saved in the PLP buffer 6b. However, by sharing the PLP buffer 6b as in this embodiment, a storage area of the write data of the unwritten data amount with the write command processing threads in ail LUNs without unevenness can be reserved in the PLP buffer 6b.

That is, since the unwritten data amount is adjusted (corrected) according to whether the data amount adjustment necessity condition holds, it is possible to reserve the storage area of the occupation reserved capacity for all the LUNs. Therefore, it is possible to share the PLP buffer 6b with a plurality of the LUNs without exhausting the PLP buffer 6b with one LUN and surely occupy the storage area of the occupation reserved capacity. At this time, the storage capacity, of the PLP buffer 6b, that can be occupied by one LUN is suppressed to the maximum occupiable capacity. Therefore, the PLP buffer 6b can be shared by a plurality of the LUNs so that a predetermined amount of storage area can be occupied with the maximum occupiable capacity as the upper limit. As a result, the write data of the unwritten data amount can be efficiently saved when the power is lost.

In addition, after sharing the PLP buffer 6b in this manner, the host 8 is notified through the command completion notification that the storage area of the write data of the unwritten data amount is reserved in the PLP buffer 6b. Therefore, it can be surely ensured that the write data for which the command completion notification was made can be saved in the PLP buffer 6b even when it is not written (recorded) to the disk 21 when power is lost after the notification. That is, it is possible to improve the data protection performance when the power is lost.

In each of the embodiments described above, the two LUNs (LUNA, LUNB) are allocated to the magnetic disk device 1, but the number of the LUNs is not particularly limited, and may be one or may be may be three or more.

For example, as in a single actuator type magnetic disk device, even when only a single LUN (hereinafter referred to as a LUNS) is allocated, it is possible to determine whether the completion notification of the write command is made in the same buffer management process.

Figure 15:
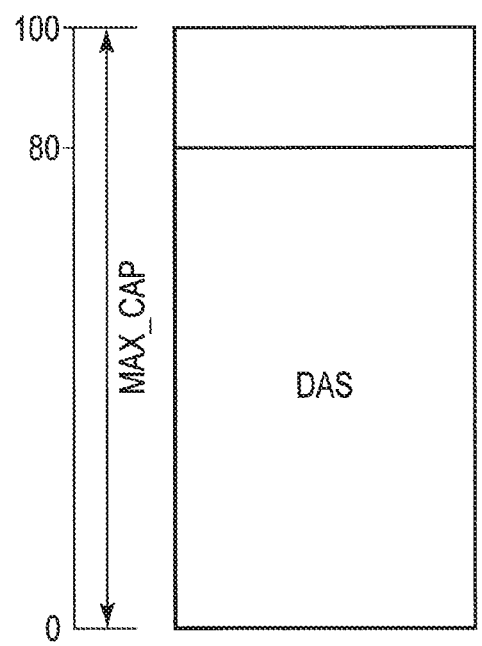
FIG. 15 is a schematic diagram showing a specific example of whether the command completion notification condition (unwritten data amount determination condition) in the buffer management process in the magnetic disk device according to the modification of the first embodiment holds.
Figure 16:
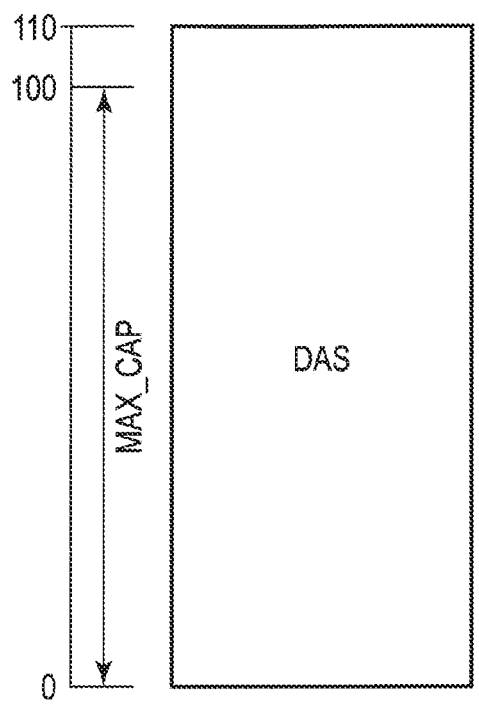
FIG. 16 is a schematic diagram showing another specific example of whether the command completion notification condition (unwritten data amount determination condition)

In this case, the command completion notification condition is determined using the unwritten data amount (DAS) of the LUNS and the buffer capacity (MAX_CAP) of the PLP buffer 6b as the determination parameters. FIGS. 15 and 16 show specific examples of whether the command completion notification condition holds. In the example shown in FIGS. 15 and 16, the PLP buffer 6b has a buffer capacity (MAX_CAP) of 100. The target LUN is the LUNS. As described above, the examples shown in FIGS. 15 and 16 correspond to modifications of the first embodiment.

In the example shown in FIG. 15, the unwritten data amount (DAS) of the LUNS is 80, which is less than or equal to the buffer capacity (MAX_CAP) (DAS≤MAX_CAP). That is, the PLP buffer 6b has a storage area in which the write data of the unwritten data amount (DAS) of the LUNS can be written (saved). Therefore, a storage area of the write data can be reserved in the PLP buffer 6b with a write command processing thread in the LUNS, which is the target LUN. As a result, the command completion notification condition holds, and the LUNS command completion notification can be sent to the host 8.

In the example shown in FIG. 16, the unwritten data amount (DAS) of the LUNS is 110, which exceeds the buffer capacity (MAX_CAP), that is DAS>MAX_CAP. Therefore, the storage area of the write data cannot be reserved in the PLP buffer 6b with the write command processing thread in the LUNS, which is the target LUN. As a result, the command completion notification condition does not hold, and the LUNS command completion notification cannot be sent to the host 8.

FIG. 17 shows a specific example of the whether the command completion notification condition when the number of the LUNs is three, in other words, the number of non-target LUNs is two or more (the total number of the LUNs including the target LUN is three or more) holds. In the example shown in FIG. 17, the PLP buffer 6b has a buffer capacity (MAX_CAP) of 100, a maximum occupiable capacity (TH1) of 60, and an occupation reserved capacity (TH2) of 10. The target LUN is the LUNA, and the non-target LUNs are the LUNB and the LUNC. That is, the LUNA is currently attempting to issue a command completion notification by reserving a storage area of the write data in the PLP buffer 6b with a write command processing thread. On the other hand, in the LUNB and the LUNC, the storage area of the write data is already reserved in the PLP buffer 6b with a write command processing thread different from that of the LUNA, and the command completion notification is made. Thus, the example shown in FIG. 17 corresponds to a modification of the third embodiment.

In the example shown in FIG. 17, the storage area of the write data is already reserved in the PLP buffer 6b with a write command processing thread in the LUNB, and the unwritten data amount (DAB) is 35. Further, the storage area of the write data is already reserved in the PLP buffer 6b with a write command processing thread in the LUNG, and the unwritten data amount (DAC) is 5. The unwritten data amount (DAA) of the LUNA is 60. Since the value exceeds the occupation reserved capacity (TH2), the value of unwritten data amount (DAA) of the LUNA and the value of unwritten data amount (DAB) of the LUNB are maintained without adjustment. On the other hand, since the value of the unwritten data amount (DAC) of the LUNG is less than the occupation reserved capacity (TH2), the value is adjusted (corrected) to the value of TH2 to be 10.

Since the maximum occupiable capacity (TH1) is 60 and the unwritten data amount (DAA) of the LUNA is less than or equal to this value, that is, DAA≤TH1, the adjustment data amount determination condition holds. That is, the PLP buffer 6b has a storage area in which the write data of the unwritten data amount (DAA) of the LUNA can be written (saved).

On the other hand, the unwritten data tonal amount is 105, which is the data amount (35+10+60) obtained by adding the actual DAA to the actual DAB and the adjusted DAC. Therefore, since the unwritten data total amount exceeds the buffer capacity (MAX_CAP), that is, DAA+DAB+DAC>MAX_CAP, the adjustment data total amount determination condition does not hold. The data amount when an actual DAC is used is 100 (35+5+40), which is less than or equal to the buffer capacity (MAX_CAP). However, the adjustment data total amount determination condition does not hold because the adjusted value is used as the LUNG data unwritten amount.

In this way, in the example shown in FIG. 17, the adjustment data amount determination condition holds, but the adjustment data total amount determination condition does not hold, so that the command completion notification condition does not hold, and the LUNA command completion notification cannot be sent to the host 8.

While certain embodiments have been described, these embodiments have been presented by way of example only, and are not intended to limit the scope of the inventions, indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   an actuator that writes data to the magnetic disk;
   a nonvolatile memory that saves the data that is not written to the magnetic disk; and
   a controller that controls the actuator and the nonvolatile memory, executes a write command for instructing the writing of the data to the magnetic disk, the write command being transmitted from a host, and notifies the host of execution completion of the write command, wherein when a first determination condition of whether a total value of an amount of the data for which execution completion has not been notified in a processing thread that executes the write command, the data having not been written to the magnetic disk, and an amount of the data for which execution completion has been notified in another processing thread that executes the write command, the data having not been written to the magnetic disk, is less than or equal to a capacity of the nonvolatile memory holds, the controller is configured to notify the host of execution completion of the write command in the processing thread.

2. The magnetic disk device according to claim 1, wherein when the first determination condition holds, and a second determination condition of whether the amount of the data that has not been written to the magnetic disk in the processing thread is less than or equal to a maximum value of a storage area, of the nonvolatile memory, which the processing thread is allowed to occupy holds, the controller is configured to notify the host of execution completion of the write command in the processing thread.

3. The magnetic disk device according to claim 1, wherein when the amount of the data that has not been written to the magnetic disk in a processing thread that executes the write command is less than a capacity value of a storage area, of the nonvolatile memory, which the processing thread is allowed to occupy without fail, the controller is configured to adjust the amount of the data to the capacity value.

4. The magnetic disk device according to claim 2, wherein when the amount of the data that has not been written to the magnetic disk in a processing thread that executes the write command is less than a capacity value of a storage area, of the nonvolatile memory, which the processing thread is allowed to occupy without fail, the controller is configured to adjust the amount of the data to the capacity value.

5. The magnetic disk device according to claim 1, wherein the actuator includes a plurality of the actuators, and a processing thread that executes the write command uniquely corresponds to any one of the plurality of actuators.

6. The magnetic disk device according to claim 2, wherein the actuator includes a plurality of the actuators, and a processing thread that executes the write command uniquely corresponds to any one of the plurality of actuators.

7. The magnetic disk device according to claim 3, wherein the actuator includes a plurality of the actuators, and a processing thread that executes the write command uniquely corresponds to any one of the plurality of actuators.

8. The magnetic disk device according to claim 4, wherein the actuator includes a plurality of the actuators, and a processing thread that executes the write command uniquely corresponds to any one of the plurality of actuators.

9. The memory management method of a magnetic disk device, comprising:
acquiring an amount of data for which execution completion has not been notified in a processing thread that executes a write command for instructing writing of the data to the magnetic disk, the write command being transmitted from a host, the data having not been written to the magnetic disk;
acquiring an amount of the data for which execution completion has been notified in another processing thread that executes the write command, the data having not been written to the magnetic disk;
determining a first determination condition of whether a total value of these amounts of the acquired data is less than or equal to a capacity of the nonvolatile memory; and
when the first determination condition holds, notifying the host of execution completion of the write command in the processing thread.

10. The memory management method of the magnetic disk device according to claim 9, further comprising:
determining a second determination condition of whether the amount of the data that has not been written to the magnetic disk in the processing thread is less than or equal to a maximum value of a storage area, of the nonvolatile memory, which the processing thread is allowed to occupy; and
when both the first determination condition and the second determination condition hold, notifying the host of execution completion of the write command in the processing thread.

11. The memory management method of the magnetic disk device according to claim 9, further comprising:
when the amount of the data that has not been written to the magnetic disk in a processing thread that executes the write command is less than a capacity value of a storage area, of the nonvolatile memory, which the processing thread is allowed to occupy without fail, adjusting the amount of the data to the capacity value.

12. The memory management method of the magnetic disk device according to claim 10, further comprising:
when the amount of the data that has not been written to the magnetic disk in a processing thread that executes the write command is less than a capacity value of a storage area, of the nonvolatile memory, which the processing thread is allowed to occupy without fail, adjusting the amount of the data to the capacity value.

* * * * *